Figure 1:
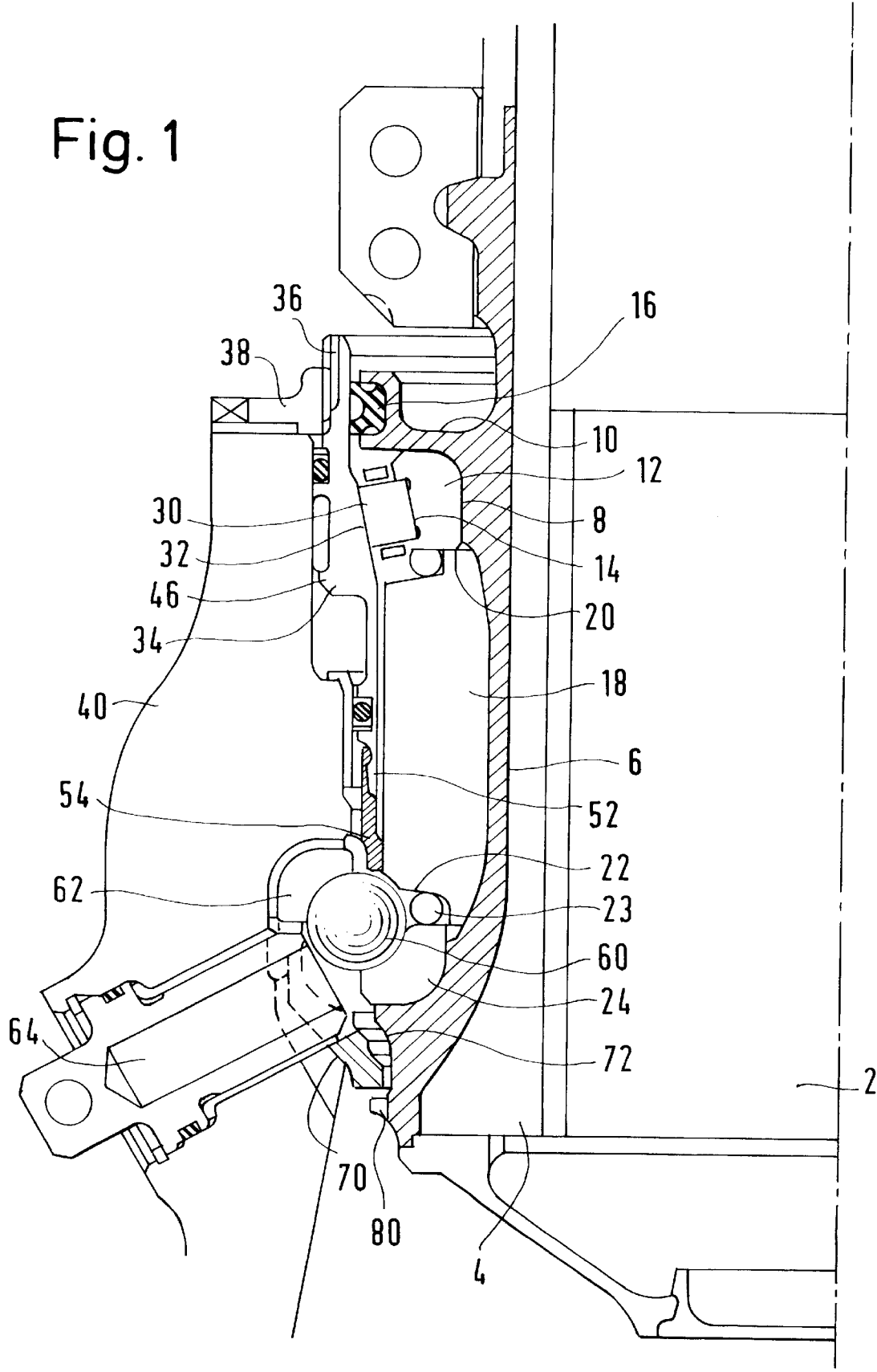

United States Patent

Dix

[11] Patent Number: 6,138,948
[45] Date of Patent: Oct. 31, 2000

[54] BEARING AND METHOD OF DISASSEMBLING SUCH A BEARING

[75] Inventor: Terence John Dix, Gloucester, United Kingdom

[73] Assignee: Dowty Aerospace, Gloucester, United Kingdom

[21] Appl. No.: 09/011,232

[22] PCT Filed: Aug. 8, 1996

[86] PCT No.: PCT/GB96/01923

§ 371 Date: Feb. 6, 1998

§ 102(e) Date: Feb. 6, 1998

[87] PCT Pub. No.: WO97/06057

PCT Pub. Date: Feb. 20, 1997

[30] Foreign Application Priority Data

Aug. 9, 1995 [GB] United Kingdom ............... 9516302
Oct. 26, 1995 [GB] United Kingdom ............... 9521958

[51] Int. Cl.[7] ............... B64C 27/00; F16C 43/06
[52] U.S. Cl. ............ 244/17.27; 384/507; 384/508; 384/511; 384/49; 384/226
[58] Field of Search ............ 244/17.27, 17.11; 384/49, 91, 129, 226, 228, 428, 435, 490, 507, 508, 511, 904

[56] References Cited

U.S. PATENT DOCUMENTS

| 1,982,283 | 11/1934 | Briner | 170/163 |
| 2,315,574 | 4/1943 | Anderson | 170/162 |
| 3,148,922 | 9/1964 | Roessler, Jr. | 384/508 |
| 4,913,564 | 4/1990 | Stephan et al. | 384/511 |
| 5,195,396 | 3/1993 | Kamiya et al. | 384/507 |
| 5,507,094 | 4/1996 | Lederman | 384/511 |
| 6,019,518 | 2/2000 | Yoon | 384/508 |

FOREIGN PATENT DOCUMENTS

| 0324617 | 7/1989 | European Pat. Off. . |
| 0390155 | 10/1990 | European Pat. Off. . |
| 194633 | 5/1938 | Switzerland . |

*Primary Examiner*—J. Woodrow Eldred
*Attorney, Agent, or Firm*—Marshall, O'Toole, Gerstein, Murray & Borun

[57] ABSTRACT

A bearing arrangement is provided in which bearings (60) are held captive between opposing bearing surfaces of laces (24, 62). A closeable delivery hole (64) provides a route through which bearings can be inserted into or removed from the space between the races (24, 62). A ball rake (54) is moveable into engagement with the bearings (60) and is rotatable so as to sweep the bearings towards the delivery hole for removal.

15 Claims, 2 Drawing Sheets

BEARING AND METHOD OF DISASSEMBLING SUCH A BEARING

The present invention relates to a bearing, and to a method of disassembling such a bearing. The bearing is suitable for use with a variable pitch propeller blade.

It is known to preload bearings in a propeller blade root assembly so as to allow bearing assemblies to remain loaded under all aerodynamic conditions. The blade bearings allow the pitch of the blade to be changed in flight. However, they also serve to lock the blade within the propeller hub. The root assembly may have an enlarged end such that the root cannot be extracted from the propeller hub whilst the bearings are in position, necessitating the hub to split.

According to a first aspect of the present invention, there is provided a bearing arrangement comprising: a first member having a first bearing surface movable with respect to a second member having a second bearing surface such that a load on bearings positioned between the first and second surfaces can be substantially removed; and a third member having engaging means for engaging at least one of the bearings such that movement of the third member urges the bearings towards an access port where they can be removed.

It is thus possible to remove the bearings from between the bearing surfaces.

Advantageously, the third member has a plurality of projections for engaging the bearings. The projections may define recesses therebetween for accepting individual bearings. The third member may be a ball rake for engaging ball bearings.

Preferably, the third member may be moveable in a first direction in order to bring the engaging means into engagement with one or more of the bearings, and moveable in a second direction to sweep the bearings towards the access port.

Preferably, the first member is a rotatable shaft supported, in use, at a first end thereof within a recess in the second member. The first member may be moveable axially with respect to the second member such that the distance between the bearing surfaces of the first and second members can be altered. Thus a clearance can be produced such that the bearings can be inserted into or extracted from the gap between the bearing surfaces.

Preferably, the third member, or a support thereof, extends along the first member to a position where it is accessible for manipulation. The third member may be rotated around the axis of the first member to move the bearings towards the access port.

Advantageously, a catching tool may be provided at the access port so as to receive the bearings. The catching tool may comprise a guide tube having a tang extending therefrom.

The bearing may be used at the root of a propeller blade. In such an embodiment, the first member is the propeller blade root and the second member is the propeller hub. The third member may be a ball rake supported on a sleeve encircling the blade root and slidable parallel to the longitudinal axis of the blade. The blade root has a first bearing surface formed at an enlarged foot thereof. The first bearing surface faces radially outward and towards the tip of the propeller blade. A complimentary surface opposing the first bearing surface is provided within the hub. The insertion of ball bearings between the bearing surfaces allows the blade to be rotatably mounted within the hub and also prevents the blade from being extracted from the hub. Once the bearings are in place, the blade is moved outwardly from the hub so as to preload the bearings. The preloading may be performed by tightening a locking/preload nut on the sleeve. The nut bears against a surface at the propeller hub. The sleeve is profiled such that the motion of the sleeve preloads the bearings.

In order to extract the bearings, the preload is released by releasing the locking/preload nut on the sleeve. The blade is moved inwardly into the hub in order to create a gap between the bearing surfaces sufficiently large to allow the ball bearings to move away from the second bearing surface and to align with the access port. The ball rake may be moved radially inwardly of the propeller hub (i.e towards the foot of the blade root) to ensure that it makes contact with the bearings.

The bearing arrangement can also be used in other applications both within the aerospace industry, for example as a rudder bearing, and outside the aerospace industry.

According to a second aspect of the present invention, there is provided a method of disassembling a bearing arrangement having first and second members each having a respective bearing surface for engaging bearings therebetween, the method comprising removing a load from the bearings, opening an access port such that the bearings can be removed from the space between the bearing surfaces, and urging the bearings towards the access port.

According to a third aspect of the present invention, there is provided a propeller assembly having blades removable from a propeller hub, one of the blades and hub having projections thereon for engaging a corresponding recess in the other one of the blades and hub such that the blades are held in the hub by a bayonet type fitting.

Preferably, the bayonet fitting acts as a backup arrangement for securing the blades into the hub.

Preferably, the bayonet fitting is aligned at a position where centrifugal blade loads are at a minimum and away from critical propeller operating angles.

Advantageously, the blades can only be inserted or extracted when they are in a feathered state, i.e at zero pitch so as to produce no thrust.

Figure 2:
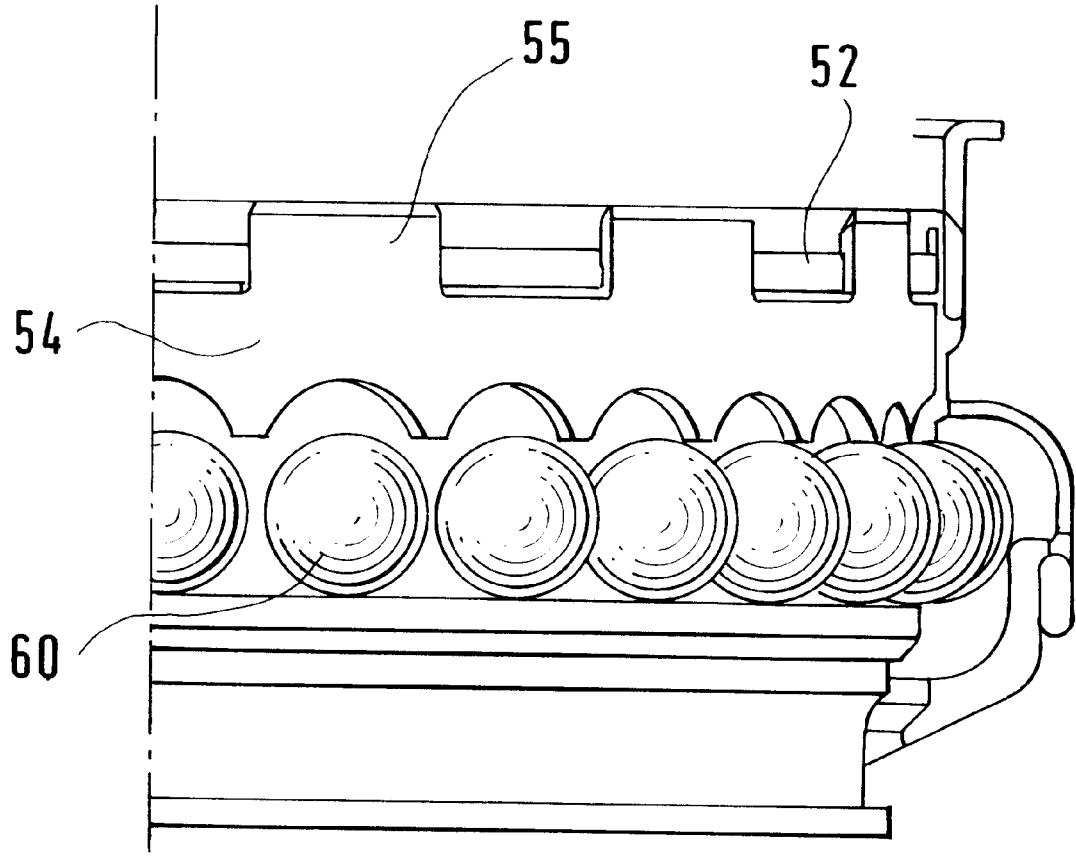

The present invention will now be described by way of example, with reference to the accompanying drawings, in which:

FIG. 1 is a part section through a propeller blade root constituting an embodiment of the present invention; and FIG. 2 is a schematic illustration of the ball rake of FIG. 1.

FIG. 1 shows a propeller blade root and bearing assembly in cross-section. The rotational axis of the propeller blade is represented by chain dot line 1. A propeller blade root 2 has a generally cylindrical form which tapers towards a region of increased diameter 4 located at the end thereof. The propeller blade root 2 carries a blade root outer sleeve 6 which can, when viewed as shown in FIG. 1, be regarded as being divided into upper and lower portions. The upper portion of the blade root outer sleeve 6 has a radially outward facing surface 8 bounded at an upper edge thereof by an outwardly extending flange 10. The surface 8 and flange 10 cooperate to define a seat for a split upper inner bearing race 12. The bearing race 12 has an outwardly facing bearing surface 14 which is inclined with respect to the axis of the propeller such that the radius at the uppermost edge of the bearing surface 14 is greater than the radius at the lower-most edge. The flange 10 carries an outwardly facing "U" shaped recess which carries as blade root seal 16.

The upper inner bearing race 12 is held in place by a split spacer 18 shaped such that a first rim 20 of the spacer 18 bears against the bearing race 12 and a second rim 22 of the spacer 18 bears against a ring 23 which itself bears against a lower split inner bearing race 24.

Upper roller bearings 30 are located between the surface 14 and an upper outer bearing sleeve 32 which is carried on a sleeve 34 (which can be regarded as an outer bearing race). The upper outer bearing surface 32 is parallel to the upper inner bearing surface 14, and the sleeve 34 is axially slidable with respect to the propeller so as to vary the distance between the opposing bearing surfaces of the upper bearing races.

The sleeve 34 carries, at an upper end thereof, a threaded portion 36 which cooperates with a locking nut 38.

The sleeve 34 fits within a recess formed in the propeller hub 40. The sleeve 34 has a radially outwardly extending lip 46 which, in use, bears against the walls of the recess and prevents diametrical movement of the sleeve within the recess. A lower end of the sleeve 34 carries an outwardly projecting band 52. A ball rake 54 has tangs 55 which extend over the band 52 so as to attach the ball rake to the sleeve 34. The ball rake extends towards the split lower inner bearing race 24, as shown in FIG. 2. In use, ball bearings 60 are held between the inner lower bearing surface 24 and an outer lower bearing surface 62 (FIG. 1) which is attached to the propeller hub 40. A closeable delivery hole/access port 64 provides a route through which the ball bearings 60 may be inserted into the space between the races 24 and 62.

In order to assemble the arrangement, the split upper bearing race 12 is fitted on to the blade root outer sleeve 6. The blade root seal 16 is then fitted into its holding groove on the blade root outer sleeve. The slit spacer 18 is the positioned so as to retain the upper inner bearing race 12, and then the upper rollers 30 are positioned on the race 12. Following this, the sleeve 34 is fitted over the rollers 30 so as to keep them in position. The ball rake 54 is then clipped on to the sleeve 34. The lower split inner race 24 is then located into its recess on the blade root outer sleeve 6. The split spacer 18 also serves to retain the lower race 24 in position. The propeller blade root assembly is now complete.

In order to position the propeller blade within the propeller hub 40, the root assembly is passed through a blade port (i.e. the open top of the recess) within the propeller hub until the blade root outer sleeve 6 and in particular surface 72 rests against a secondary retention ring 70. The ball bearings 60 are then passed through the delivery hole 64 into the space between the lower outer race 62 and the split lower inner race 24. Once the ball bearings 60 are in position, the delivery port 64 is closed and the locking nut 38 is then tightened so as to bear against the upper end of the hub 40 and thereby to move the sleeve 34 upwardly so as to preload the bearings.

In order to remove the bearings for replacement or inspection, the locking nut 38 is released and the propeller blade is pushed into the hub (i.e downwardly as shown in FIG. 1) until face 72 of the blade root abuts the secondary retention ring 70. This causes the inner bearing race 24 to move so as to uncover the delivery hole 64.

The sleeve 34 is pushed inwardly (i.e downwards in FIG. 1) such that the ball rake 54 engages the ball bearings 60. The delivery hole 64 is opened and a collecting tool (not shown) is inserted into the hole 64. The sleeve 34 is then rotated so as to cause the ball rake 54 to rotate. This, in turn, sweeps the ball bearings 60 around the ball race 24 towards the delivery hole 64. The collecting tool may have a tang which extends towards the ball race 24 and arts to scoop the bearings into the delivery hole for extraction therethrough.

Once the ball bearings have been removed, the propeller blade can be extracted from the hub.

The blade root and hub may be modified to include a back-up securing mechanism. The secondary retention ring 70 may have a plurality of slots formed in its inner surface. The blade root may also be modified by the provision of a plurality of projections 80 at the foot thereof. The projections 80 and slots in the secondary retention ring are profiled such that the projections can pass through the slots so as to reach behind the secondary retention ring 70. The blade can then be rotated such that the projections no longer align with the slots and thereby prevent withdrawal of the propeller blade. Thus, the projections 80 and secondary retention ring form a bayonet type fitting which serves to prevent accidental disengagement of the blade when the ball bearings 60 have been removed and which also provide additional security in the event that the bearings fail catastrophically during flight.

What is claimed is:

1. A bearing arrangement comprising a first member having a first bearing surface moveable with respect to a second member having second bearing surface such that a load on bearings positioned between the first and second surfaces can be substantially removed, characterised by a third member having engaging means for engaging at least one of the bearings such that movement of the third member urges the bearings towards an access port where they can be removed.

2. A bearing arrangement as claimed in claim 1, characterised in that the third member has a plurality of projections for engaging the bearings.

3. A bearing arrangement as claimed in claim 2, characterised in that the projections define recesses therebetween for accepting individual bearings.

4. A bearing arrangement as claimed in claim 1, characterised in that the third member is moveable in a first direction to bring the engaging means into engagement with at least one of the bearings, and moveable in a second direction to sweep the bearings towards the access port.

5. A bearing arrangement as claimed in claim 1, characterised in that the first member is a rotatable shaft supported at a first end thereof within the second member.

6. A bearing arrangement as claimed in claim 1, characterised in that the first member is moveable axially with respect to the second member such that the distance between the first and second bearing surfaces can be altered.

7. A bearing arrangement as claimed in claim 1, characterised in that the third member, or a support thereof, extends along the first member to a position where it is accessible for manipulation.

8. A bearing arrangement as claimed in claim 7, characterised in that the third member is rotated around the axis of the first member to move bearings towards the access port.

9. A bearing arrangement as claimed in claim 1, characterised by a catching tool insertable into the access port so as to receive the bearings.

10. A bearing arrangement as claimed in claim 1, characterised in that the first member is the root of a propeller blade and the second member is a propeller blade hub.

11. A bearing arrangement as claimed in claim 10, characterised in that the third member is a ball rake supported on a sleeve encircling the blade root and slidable parallel to the longitudinal axis of the blade.

12. A bearing arrangement as claimed in claim 10 characterised in that the blade root carries the first bearing surface at an enlarged foot thereof, the first bearing surface facing radially outward and towards the top of the propeller blade, and in that a complimentary surface opposing the first bearing surface is provided within the hub.

13. A bearing arrangement as claimed in claim 1, characterised by means for applying a preload to the bearings and for maintaining the bearings in a preloaded state.

14. A bearing arrangement as claimed in claim 10, further characterised by one of the propeller blade and hub having projections formed thereon for engaging associated recesses in the other of the propeller blade and hub such that the blades are held in the hub by a bayonet-type fitting.

15. A method of disassembling a bearing arrangement having first and second members each having a respective bearing surface for engaging bearings therebetween, and a third member for engaging at least one of the bearings such that movement of the third member urges the bearings towards an access port where they can be removed, the method comprising substantially removing a load from the bearings, opening the access port such that the bearings can be removed from the space between the bearing surfaces, and urging the bearings towards the access port.

* * * * *